United States Patent
Burgdorf et al.

[11] Patent Number: 5,401,085
[45] Date of Patent: Mar. 28, 1995

[54] BRAKE PRESSURE CONTROL APPARATUS FOR A HYDRAULIC AUTOMOTIVE VEHICLE BRAKE SYSTEM

[75] Inventors: Jochen Burgdorf, Offenbach-Rumpenheim; Helmut Steffes, Hattersheim; Peter Volz, Darmstadt; Erhard Beck, Weilburg; Dalibor Zaviska, Frankfurt am Main; Albrecht Otto, Hanau-Mittelbuchen; Stefan Risch, Wiesbaden, all of Germany

[73] Assignee: Alfred Teves GmbH, Frankfurt am Main, Germany

[21] Appl. No.: 960,414

[22] PCT Filed: Jan. 29, 1992

[86] PCT No.: PCT/EP92/00185
§ 371 Date: Feb. 16, 1993
§ 102(e) Date: Feb. 16, 1993

[87] PCT Pub. No.: WO92/18364
PCT Pub. Date: Oct. 29, 1992

[30] Foreign Application Priority Data
Apr. 18, 1991 [DE] Germany ............... 41 12 673.4
Jul. 31, 1991 [DE] Germany ............... 41 25 304.3

[51] Int. Cl.⁶ ............................................. B60T 8/32
[52] U.S. Cl. ........................... 303/115.1; 303/116.1; 137/627.5; 137/596.16
[58] Field of Search ............ 303/115.1, 116.1, 117.1, 303/119.1, 113.1; 137/627.5, 596.14, 596.16

[56] References Cited
U.S. PATENT DOCUMENTS

| | | |
|---|---|---|
| 3,105,508 | 10/1963 | Bowditch et al. ............... 137/627.5 |
| 3,871,716 | 3/1975 | Skoyles ........................... 303/115.1 |
| 3,905,393 | 9/1975 | Hartwig .......................... 137/596.14 |
| 4,296,971 | 10/1981 | Nakazato ....................... 303/115.1 |
| 4,715,666 | 12/1987 | Farr ................................ 303/116.1 |
| 4,773,447 | 9/1988 | Imanaka et al. ............... 137/627.5 |
| 4,889,395 | 12/1989 | Fujita et al. .................... 303/115.1 |

FOREIGN PATENT DOCUMENTS

| | | |
|---|---|---|
| 0171901 | 2/1986 | European Pat. Off. . |
| 0303261 | 2/1989 | European Pat. Off. . |
| 3919842 | 12/1990 | Germany . |
| 2090929 | 7/1982 | United Kingdom . |
| 8001783 | 9/1980 | WIPO . |

*Primary Examiner*—Robert J. Oberleitner
*Assistant Examiner*—Peter M. Poon
*Attorney, Agent, or Firm*—Ratner & Prestia

[57] ABSTRACT

A brake pressure control apparatus having a brake pressure master unit, a brake connected to the brake pressure master unit through a pressure line, a pressure-controlled inlet valve which is positioned in the pressure line and through which the brake pressure master unit is connected, in a first switching position, through a restrictor orifice to the brake and which is furnished with a control piston which in one direction is subject to the pressure in the pressure line and in the opposite direction is subject to the action of a spring and of the pressure in a return line which contains an outlet valve which is controllable by a control device, which blocks the return line in its position of rest and which releases the return line in its switching position. The inlet valve is provided with a valve element which interacts with the control piston and which, in the second switching position, blocks the pressure line and releases a valve seat formed by a longitudinal bore of the control piston making the brake pressure slave unit connectible to the return line.

30 Claims, 4 Drawing Sheets

BRAKE PRESSURE CONTROL APPARATUS FOR A HYDRAULIC AUTOMOTIVE VEHICLE BRAKE SYSTEM

BACKGROUND OF THE INVENTION

The present invention relates to a brake pressure control apparatus for a hydraulic automotive vehicle brake system and includes (1) a brake pressure master unit, (2) at least one brake pressure slave unit connected to the brake pressure master unit through a pressure line for the actuation of a brake, (3) a pressure-controlled inlet valve which is positioned in the pressure line and through which the brake pressure master unit is connected, in a first switching position of the inlet valve, unrestrictedly and, in a second switching position of the inlet valve, through a restrictor orifice to the brake pressure slave unit. The pressure-controlled inlet valve has a control piston which, in one direction, is subject to the pressure in the pressure line and, in the opposite direction, is subject to the action of a spring and of the pressure in a return line which is connected to the valve and which contains an outlet valve which is controllable by a control device, which blocks the return line in its position of rest and which releases the return line in its switching position.

Brake pressure control apparatus of this type serve in the automatic control of the brake pressure depending on the rotary motion of one or a plurality of wheels of a vehicle. The rotary motion of the wheels is monitored by the control apparatus to avoid the blocking of the wheels by the braking operation or by a racing of the driven wheels when starting.

A brake pressure control apparatus of this type is known from U.S. Pat. No. 4,715,666. In this brake pressure control apparatus, the inlet valve is arranged as a flow control valve, the restrictor orifice being positioned in a longitudinal bore of the control piston and the control piston being subject exclusively to the pressure of the pressure master unit and to the pressure in the return line. The state-of-the-art flow control valve has the disadvantage that the effect of a pressure reduction in the pressure line leading to the brake pressure slave unit upon the aperture of the outlet valve takes place only with a delay, because the control piston must first be shifted before hydraulic pressure fluid can be withdrawn from the brake pressure slave unit. In view of the short control times which are required for pressure reductions and for pressure increases in slip control action of the brake, such a delay of the pressure reduction adversely affects the control function.

Furthermore, a precise positioning of the connecting bores interacting with the control piston is necessary in the prior-art flow control valve which boosts the costs of manufacture.

Another hydraulic brake system for automotive vehicles with anti-locking control is known from the German patent application published without examination, U.S. Pat. No. 3,919,842 in which the brake pressure control apparatus has a throttle valve in the line leading from the brake pressure master unit to the brake pressure slave unit. Depending on the pressure at the outlet of a pump circuit which starts to conduct on the outset of a control action, the throttle valve is switched from a first switching position with free passage into a second switching position in which the connection between the brake pressure slave unit and the brake pressure master unit is restricted. In such an arrangement, the outlet valve may be connected directly to the brake pressure slave unit, so that a rapid pressure reduction is possible. However, additional non-return valves are required to prevent any pressure reduction in the control line of the throttle valve upon actuation of the brake without brake pressure control action.

SUMMARY OF THE INVENTION

The present invention has as an object to provide a brake pressure control apparatus of the type described above which can effect rapid pressure reduction when the outlet valve is opened.

According to the present invention, this object is achieved with an inlet valve which has a valve element which interacts with the control piston and which, in the second switching position, blocks the pressure line and releases a valve seat formed by a longitudinal bore of the control piston and rendering the brake pressure slave unit connectible to the return line. In addition, the brake pressure slave unit is connected through a cross-sectional area of a restrictor to the return line in parallel to the valve seat of the control piston.

In the present invention, the brake pressure slave unit is, in the first switching position of the inlet valve, also separated from the return line. In the event of the opening of the outlet valve and the consequent switching motion of the control piston, the pressure reduction starts, however, before the connection to the return line is opened because hydraulic pressure fluid is withdrawn from the pressure line which leads to the brake pressure slave unit for moving the control piston. Furthermore, due to the double-seated valve configuration of the inlet valve, very short switching distances and short switching times are possible.

According to the present invention, a ring-shaped passage may be formed between the outside surface of the control piston and the valve bore in which the control piston is accommodated. In this context, the control piston may be formed with radial grooves in its outside surface in the interest of attaining a defined sliding effect. Due to this configuration, slight and constant shifting forces can occur at the control piston, resulting in a quick switching in the presence of a slight differential pressure. Moreover, due to the cross-sectional area of the restrictor between the return line and the brake pressure slave unit, the switching back of the inlet valve in the pressure rebuilding-up phase is facilitated and a pressure balance between the return line and the pressure line, without the switching function of the valve being thereby impaired during the pressure reduction, is made possible.

According to another aspect of the present invention, the restrictor orifice is exchangeably positioned in a duct which connects both branches of the pressure line in parallel to the inlet valve. In this way, a tuning of the cross-sectional area of the orifice is afforded during the manufacture or during the incorporation of the brake pressure control apparatus to compensate for deviations in the control behavior which are caused by manufacturing inaccuracies. According to the present invention, filter elements may be positioned on either side of the restrictor orifice, so that any soiling of the orifice and, consequently, any alteration of the restricting effect is avoided. Preferably, the restrictor orifice and the filter elements are accommodated in a bushing which is insertable into a housing bore from the outside.

In accordance with another aspect of the present invention, the inlet valve is arranged in the shape of a double-seated ball valve with a valve element which is formed by a ball and which interacts with an external valve seat rigid with the housing and a movable internal valve seat. This configuration favors an easy and precise manufacture of the inlet valve. By means of a spring, the valve element of the inlet valve may be subjected to the action of a force directed onto the valve seats, so that in the position of rest of the valve, the valve element is urged against the valve seat of the control piston and, in the event of switching, it is assisted in its closing movement by the spring. However, this configuration makes more difficult the venting of the valve chamber connected to the return line.

In order to ensure a regular venting of the valve chamber which is connected to the return line, according to another aspect of the present invention, the valve element, in its position of rest, is maintained in a position so as to be lifted off from the valve seats by the force of a spring which takes support at the external valve seat and means are provided for the generation of a dynamic pressure opposing the spring force by which the valve element is urged against the internal valve seat at the control piston in the presence of a flow of hydraulic pressure fluid directed from the brake pressure master unit over the pressure line to the brake pressure slave unit or to the return line. According to the present invention, the means for the generation of a dynamic pressure may consist of a cylindrical bushing which surrounds the valve element, constituted by a ball, and is spaced from the valve element by a slight distance. In this inventive configuration, both valve seats are open in the position of rest of the inlet valve, so that the return line is connected with the pressure line and air bubbles which have entered the return line are allowed to escape. Any deterioration of the switching speed of the inlet valve due to air bubbles which have entered the return line is, thus, avoided.

According to yet another aspect of the present invention, the inlet valve is provided with a seat valve having a valve element which is actuatable by the control piston which, in the restricting position, blocks a valve seat which is disposed in parallel to the restrictor orifice. In the restricting position, the control piston is movable independently of the valve element under the control initiated by the pressure.

In the brake pressure control apparatus of the present invention, the brake pressure slave unit is, in the first switching position of the inlet valve, also separated from the return line. In the event of the opening of the outlet valve and of the consequent switching motion of the control piston, the pressure reduction at the brake pressure slave unit starts, however, before the connection to the return line is opened because hydraulic pressure fluid is withdrawn from the pressure line which leads to the brake pressure slave unit. Furthermore, the closing travel of the seat valve can be sized to be very short, so that very short switching times are possible. The separation of the control piston from the valve element leads, moreover, to the advantage that the control edges or the valve bores which interact with the control piston need not be positioned very exactly, so that relatively easy and inexpensive manufacture are possible. The cross-sectional area of the control piston can be sized to be small because it does not have any connecting bores. This results in a small assembly space and also contributes to reducing the cost of manufacture and to shortening the switching times. In addition, the sliding fit between the control piston and its accommodating bore renders less expensive the sealing with respect to the outlet valve.

According to one advantageous development of the present invention, the control piston is accommodated within a longitudinal bore of a cylindrical valve insert which bears the valve seat at one end and which is furnished with valve bores opening in the longitudinal bore at a distance from each other and being connectible to each other by means of a control groove in the control piston. By this embodiment, fabrication and the incorporation of the inlet valve into a housing block is simplified. In this embodiment, a ring-shaped filter insert which covers the mouth of the valve bore can be provided in a groove in the outside surface of the valve insert. Furthermore, the valve element, which is formed by a ball, may be positioned, together with a valve spring acting on the valve element, within a cup-shaped filter element retained in its mounting position within a housing bore by the valve insert.

The invention will be described in more detail in the following description, making reference to the embodiments which are illustrated in the accompanying drawings.

DETAILED DESCRIPTION OF THE INVENTION

Figure 1:
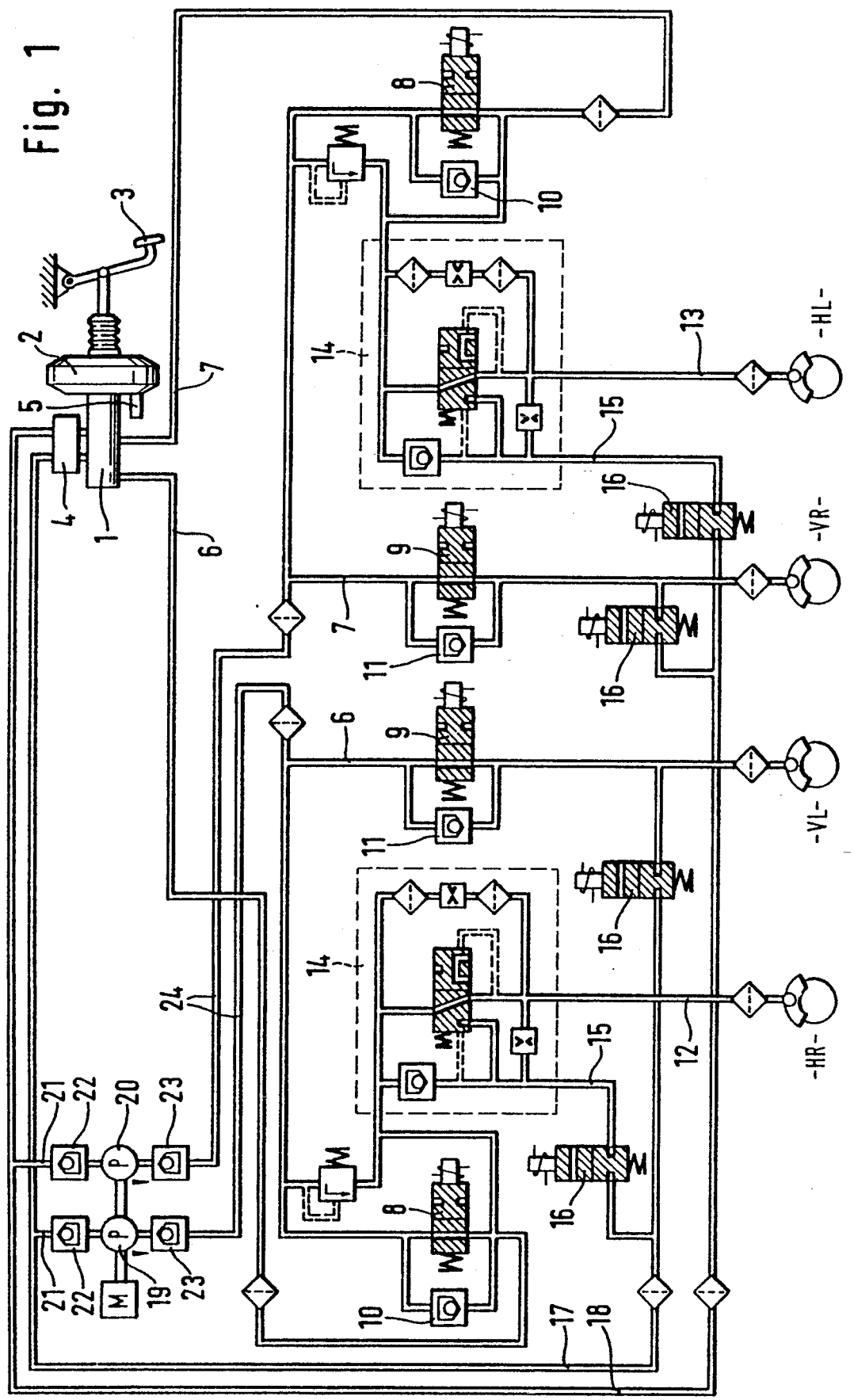
FIG. 1 is a diagrammatic representation of a hydraulic automotive vehicle brake system in which a brake pressure control apparatus, constructed in accordance with the present invention, is incorporated.

The hydraulic brake system illustrated in FIG. 1 is comprised of a master brake cylinder 1 with a vacuum brake power booster 2 which is actuated by a brake pedal 3. The master brake cylinder 1 is furnished with a supply tank 4 for the hydraulic pressure fluid which is connected with the power chambers of the master brake cylinder 1 as long as the brake pedal 3 is not actuated. At the vacuum brake power booster 2, a travel switch 5 is disposed which monitors the stroke of the booster piston. The signals of the travel switch 5 serve in the control of the pump and the positioning of the brake pedal 3 during a brake slip control action.

From the master brake cylinder 1, a first pressure line 6 leads to a brake VL which is positioned at the lefthand front wheel of a vehicle and a second pressure line 7 leads to a brake VR which is positioned at the righthand front wheel of the vehicle. In each of the pressure lines 6, 7, two electromagnetically actuatable valves 8, 9 are disposed, one behind the other, which are open in the position of rest and which, by energization of their actuating magnet, are switched into a blocking position in which they block the pressure lines 6, 7. In parallel to the valves 8 are non-return valves 10 which open up in the direction of the brakes VL, VR. Non-return valves 11, which are disposed in parallel to the valves 9, open up in the direction of the master brake cylinder 1.

Between the master brake cylinder 1 and the valves 8, the pressure lines 12, 13 branch off from the pressure lines 6, 7. Pressure lines 12 and 13 lead to a righthand rearwheel brake HR and a lefthand rearwheel brake HL, respectively. In the pressure lines 12, 13, pressure-controlled inlet valves 14 are arranged. The make-up and mode of operation of inlet valves 14 will be described with reference to FIGS. 2 and 3. The inlet valves 14 are open in their position of rest and are switched into a blocking position in which a restrictor orifice is inserted in the pressure lines 12, 13.

Brakes VL, VR are connected directly to return lines 17, 18, respectively, through outlet valves 16 and brakes HR, HL are connected to return lines 17, 18, respectively, through inlet valves 14, outlet lines 15 and outlet valves 16. The return lines 17, 18 lead to the supply tank 4. The electromagnetically actuatable outlet valves 16 are blocked in their position of rest and are switched into an open position by energization of their actuating magnet.

A pump 19, 20 is associated with each of the pressure lines 6, 7. The pumps 19, 20 are driven by a common motor M. The suction sides of the pumps are connected through suction lines 21 with the return lines 17, 18. Each suction line 21 contains a suction valve 22 which blocks in the direction of the return line. The delivery sides of the pumps 19, 20 are each connected through a pressure valve 23, a pressure line 24 and the valves 8, 9 to the pressure lines 6, 7, respectively. A pressure can, thus, be built up in the pressure lines 6, 7 and in the pressure lines 12, 13 which are linked by the operation of the master brake cylinder 1 and the operation of the pumps 19, 20, depending on the control of the brake system. Thus, the master brake cylinder 1 and the pumps 19, 20 constitute the brake pressure master unit. The wheel brake cylinders of the brakes VL, VR, HL, HR constitute the brake pressure slave unit. The pressure lines 6, 12, on one side, and the pressure lines 7, 13, on the other side, each form an independent brake circuit. Accordingly, to each brake circuit, brakes are connected which are disposed diagonally with respect to the vehicle.

In the described brake system, the pressure at the wheels VL, VR for the control of the brake slip or of the traction slip at the front wheels of the vehicle is varied in the state-of-the-art manner by an alternate actuation of the associated valves 9 and outlet valves 16. The hydraulic pressure fluid required for the control is delivered by the pumps 19, 20. The valves 8 are actuated for traction slip control action to prevent the hydraulic pressure fluid, which is delivered by the pumps 19, 20, from reaching the master brake cylinder 1. A control of the brake pressure at the brakes HR, HL of the rear wheels of the vehicle takes place by operation of the associated inlet valves 14 and outlet valves 16 and will be described in detail with reference to the embodiment illustrated in FIG. 2.

Figure 2:
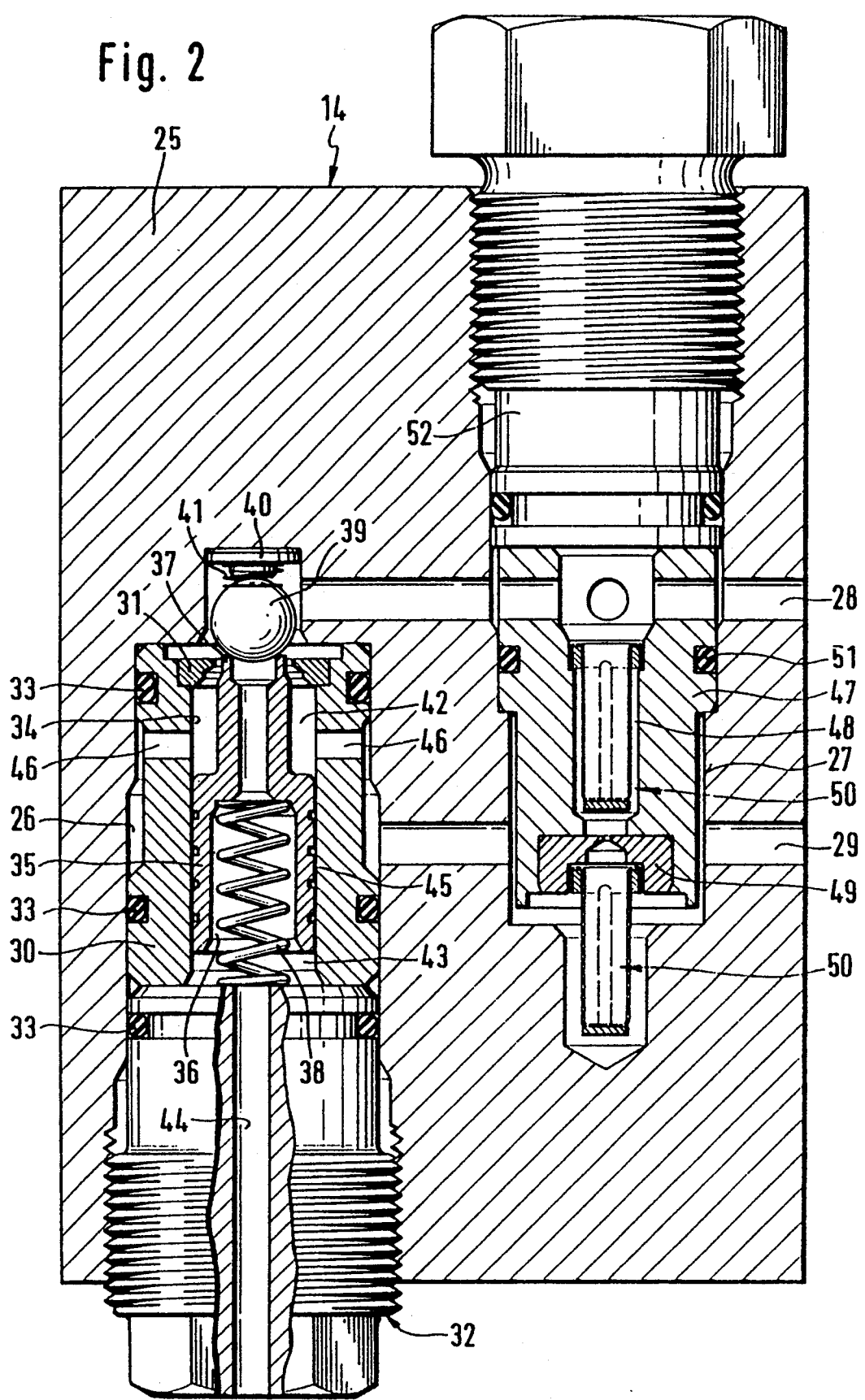
FIG. 2 is a cross-sectional view of one embodiment of the hydraulically controlled inlet valve of the inventive brake pressure control apparatus.

In the embodiment of the pressure-controlled inlet valve 14 shown in FIG. 2, parallel stepped bores 26, 27 are provided within a housing 25 and parallel duct bores 28, 29 are provided which are disposed at right angles to the stepped bores and extend through the stepped bore 27 and open into the stepped bore 26. In the stepped bore 26, there is accommodated a bushing-shaped valve insert 30 with a valve seat 31 which is held in position by a connecting plug 32. Sealing rings 33 seal off the valve insert 30, on either side of the duct bore 29, and the connecting plug 32 in the stepped bore 26. The valve insert 30 is formed with a bore 34 having a diameter which is larger than the inside diameter of the valve seat 31. Within the bore 34, a control piston 35, with a stepped longitudinal bore 36, is arranged for axial movement. Control piston 35 has a valve seat 37 at its tapered end which projects through the valve seat 31. A compression spring 38, supported at one end at the connecting plug 32, urges the valve seat 37 of the control piston 35 against a ball 39 which serves as a valve element which is in abutment against a stop disc 40 at the bottom of the stepped bore 26. The ball 39 is so positioned as to be lifted off from the valve seat 31. Between stop disc 40 and ball 39, a compression spring 41 is positioned whose prestressing force is lower than the force of the compression spring 38. The control piston 35 divides the bore 34 into a valve chamber 42 positioned adjacent to the valve seat 31, on one side, and an outlet chamber 43, on the other side, into which a connecting bore 44, extending through the connecting plug 32, opens. The outside surface of the control piston 35, which is guided within the bore 34, is provided with radial grooves, and the play between the outside surface of the control piston and the bore 34 is sized such that a ring-shaped passage 45 is formed through which a small quantity of hydraulic pressure fluid may pass. Through radial bores 46, valve chamber 42 is connected with the duct bore 29. The duct bore 28 opens into the final step of the stepped bore 26 accommodating the ball 39. This final step is separated from the bore 34 by the valve seat 31 and the seal 33 positioned adjacent to it.

In the stepped bore 27, there is a bushing 47 with a longitudinal bore 48 through which the duct bores 28, 29 are interconnected. A restrictor orifice 49 is positioned in the longitudinal bore 48. On either side of the restrictor orifice 49, there are filter cartridges 50 which prevent a soiling of the restrictor orifice 49. Sealing rings 51 seal the bushing 47 in the stepped bore 27 between the duct bores 28, 29. The bushing 47 is retained by a plug 52 which closes off the stepped bore 27 toward the outside. Bushing 47 permits insertion of the restrictor orifice 49 into the stepped bore 27 without the risk of soiling, because the filter cartridges 50 can be coupled to the bushing 47 before assembly and immediately following a cleaning of the restrictor orifice 49.

FIG. 2 shows the inlet valve 14 in its normal position in which the duct bore 28, connected to the pressure line 6 or 7, is connected through the open valve seat 31 with the duct bore 29 which is connected to the pressure line 12 or 13. In parallel to the valve seat 31, the duct bores 28, 29 are, furthermore, interconnected through the restrictor orifice 49. The valve seat 37 is closed by the ball 39, so that the outlet chamber 43 is connected to the duct bores 28, 29 exclusively through the restricting cross-sectional area 45 along the outside surface of the control piston 35. This is sufficient to afford a pressure balance between the outlet chamber 43 and the duct bores 28, 29. The inlet valve 14 will remain in this position as long as no brake pressure control action takes place and the outlet valve 16, connected to the connecting bore 44, is in the closed condition. The brakes HR, HL can be pressurized by actuating the master brake cylinder 1 in response to the force applied by the brake pedal 3. If and when, during a braking operation, one of the vehicle wheels, for example the righthand rear wheel, tends to be locked as determined by means of sensors provided for this purpose, then the outlet valve 16 of the brake HR associated with that wheel will be switched into its open position by an electronic controller, with the result that the pressure in the outlet chamber 43 will drop to the pressure in the return line 17, while the pressure generated for the actuation of the brakes will still exist in the valve chamber 42 and in the duct bores 28, 29. The differential pressure at the control piston 35, which comes about suddenly, causes the control piston 35 to slide against the force of the spring 38, in the direction of the outlet chamber 43, whereby the ball 39 will close the valve seat 31 and will be lifted off from the valve seat 37 to interrupt the direct connection of the duct bores 28, 29 and to connect the duct bore 29 to the outlet chamber 43. During this operation, the sliding of the control piston 35 will cause a pressure reduction in the duct bore 29 and, thus, at the wheel cylinder of the connected brake HR. After the opening of the valve seat 37, the pressure reduction will continue due to the flow of hydraulic pressure fluid out of the valve chamber 42 through the longitudinal bore 36, the outlet chamber 43, the connecting bore 44, and the outlet line 15 into the return line 17. In this position of the inlet valve 14, only a limited volume of hydraulic pressure fluid can be taken in through the restrictor orifice 49 from the duct bore 28. The cross-sectional area of the outlet of the valve seat 37 is, however, sized, relative to the cross-sectional area of the restrictor orifice 49, that, by this flow of hydraulic pressure fluid, the rapid pressure reduction will not be impaired.

If and when the brake slip control action requires a renewed pressure build-up, then the outlet valve 16 will be closed. As a result, the pressure in the outlet chamber 43 will adapt to the pressure existing in the valve chamber 42, so that the compression spring 38 can cause the control piston 35 to slide a sufficient distance until the valve seat 37 abuts against the ball 39. The differential pressure which has come about between the duct bores 28, 29, in the event of the pressure reduction, will, however, continue to retain the ball 39 on the valve seat 31. The renewed pressure build-up will be achieved by the hydraulic pressure fluid which flows through the restrictor orifice 49 into the duct bore 29 and which is delivered to the duct bore 28 by the pump 19 or 20 being driven by the motor M which will be switched in at the moment of a start of the brake slip control action. The speed of the pressure rise will, in this configuration, be determined by the dimensioning of the cross-sectional area of the restrictor orifice 49.

By a clocked actuation of the relevant outlet valve 16, a pressure-maintaining phase is achieved in that the volume of hydraulic pressure fluid which is discharged through the outlet valve 16 is adapted to the volume of hydraulic pressure fluid which is supplied through the restrictor orifice 49. In an analogous manner, the valve opening times of the outlet valve 16 will be varied by a clocked actuation such that different pressure build-up speeds and pressure reduction speeds come about.

If and when, during the control action, the pressure in the duct bore 29 is adapted to the pressure in the duct bore 28 or, if and when, the pressure in the master brake cylinder 1 is reduced to such an extent that the pressure in the duct bore 28 reaches or falls short of the pressure in the duct bore 29, then the ball 39 will be lifted off from the valve seat 31 and will afford an unrestricted return flow of the hydraulic pressure fluid to the master brake cylinder 1. A pressure reduction or a release of the brake by a change of the actuating force at the brake pedal will, therefore, be possible at any time.

Figure 3:
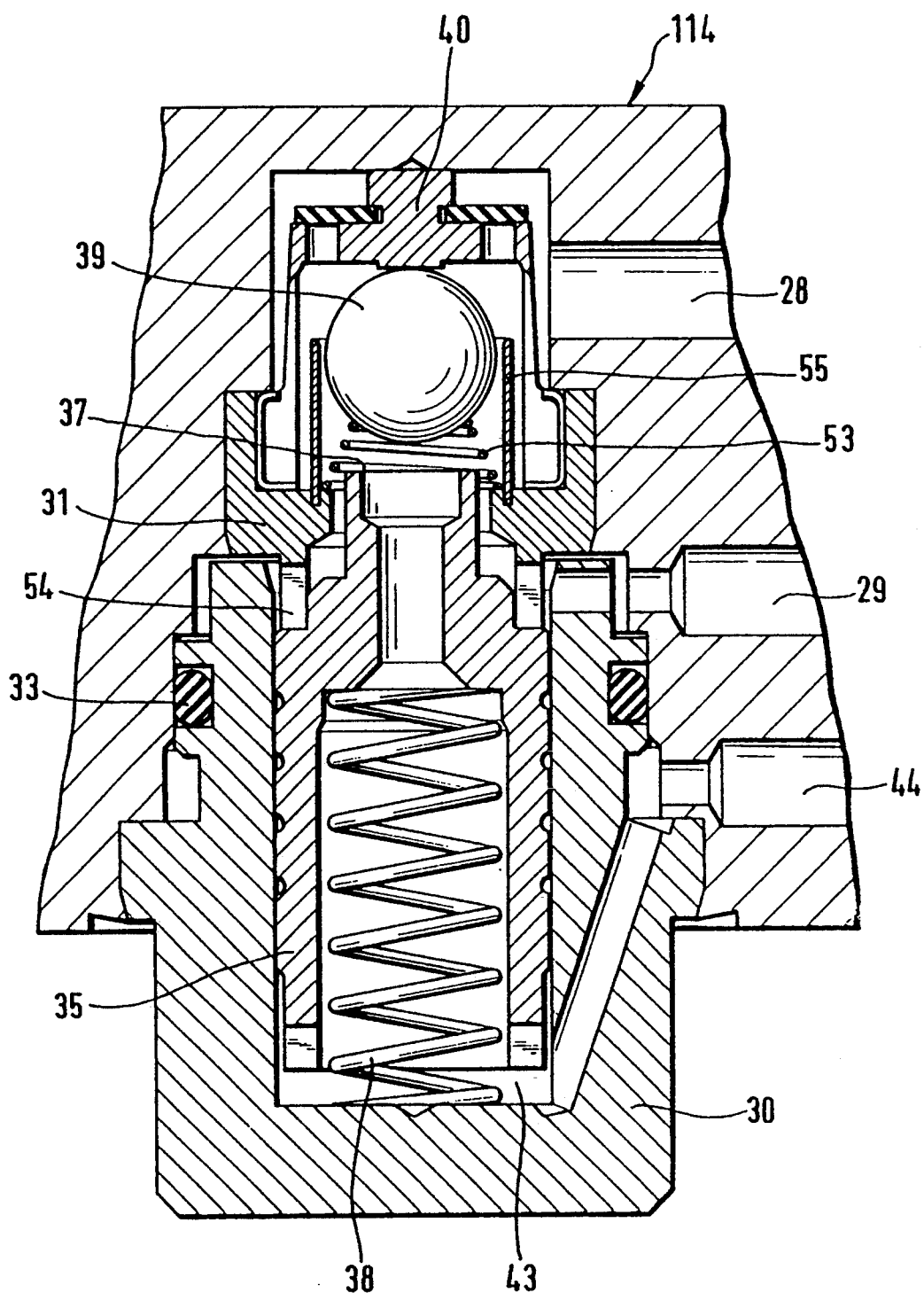
FIG. 3 is a cross-sectional view of another embodiment of the inlet valve of the inventive brake pressure control apparatus.

FIG. 3 shows an embodiment of an inlet valve 114 which is different from the embodiment according to FIG. 2. Components in FIG. 3, corresponding to components in FIG. 2 have been given identical reference numerals. In the inlet valve 114, the ball 39 is urged against the stop disc 40 by a compression spring 53 so that it is lifted off from the valve seat 31 and from the valve seat 37 in its position of rest. The stroke of the control piston 35 is limited by a slotted stop collar 54 of the valve seat 31 and, therefore, cannot be moved by the compression spring 38 a distance sufficient to bring the valve seat 37 into abutment against the ball 39. A cylindrical bushing 55 is fixed to the valve seat and surrounds the ball 39 with play.

The inlet valve 114 is incorporated in the illustrated position with the ball directed upward. Any air bubbles which might enter into the outlet chamber 43 can, in this way, escape through the valve seat 37 which is open in the position of rest. An automatic venting of the outlet chamber 43 will, thus, take place. In this way, any deterioration of the switching function of the inlet valve 114, by air which has entered into the valve, will effectively be avoided. The closing of the valve seat 37 will take place in the event of the actuation of the brake or possibly at the moment of opening of the outlet valve 16 due to the dynamic pressure which comes about at the ball 39 and which is generated by the ring-shaped passage between the ball 39 and the bushing 55 when the hydraulic pressure fluid flows out of the duct bore 28 into the duct bore 29. Other differences between the configuration of the inlet valve 114 of FIG. 3 and the inlet valve 14 are of a purely constructional nature. Otherwise, the mode of operation of the inlet valve 114 corresponds to the mode of operation described above of the inlet valve 14. Analogously, a restrictor orifice 49, not shown in FIG. 3, is provided between the duct bores 28, 29,. The restrictor orifice may, in this embodiment, also be constituted by a ring-shaped passage, insofar as the bushing 47 is necked in a range in which the ball is positioned when the outlet valve 16 is open. The valve seat 31 is, in this embodiment, not closed tightly by the ball 39.

Figure 4:
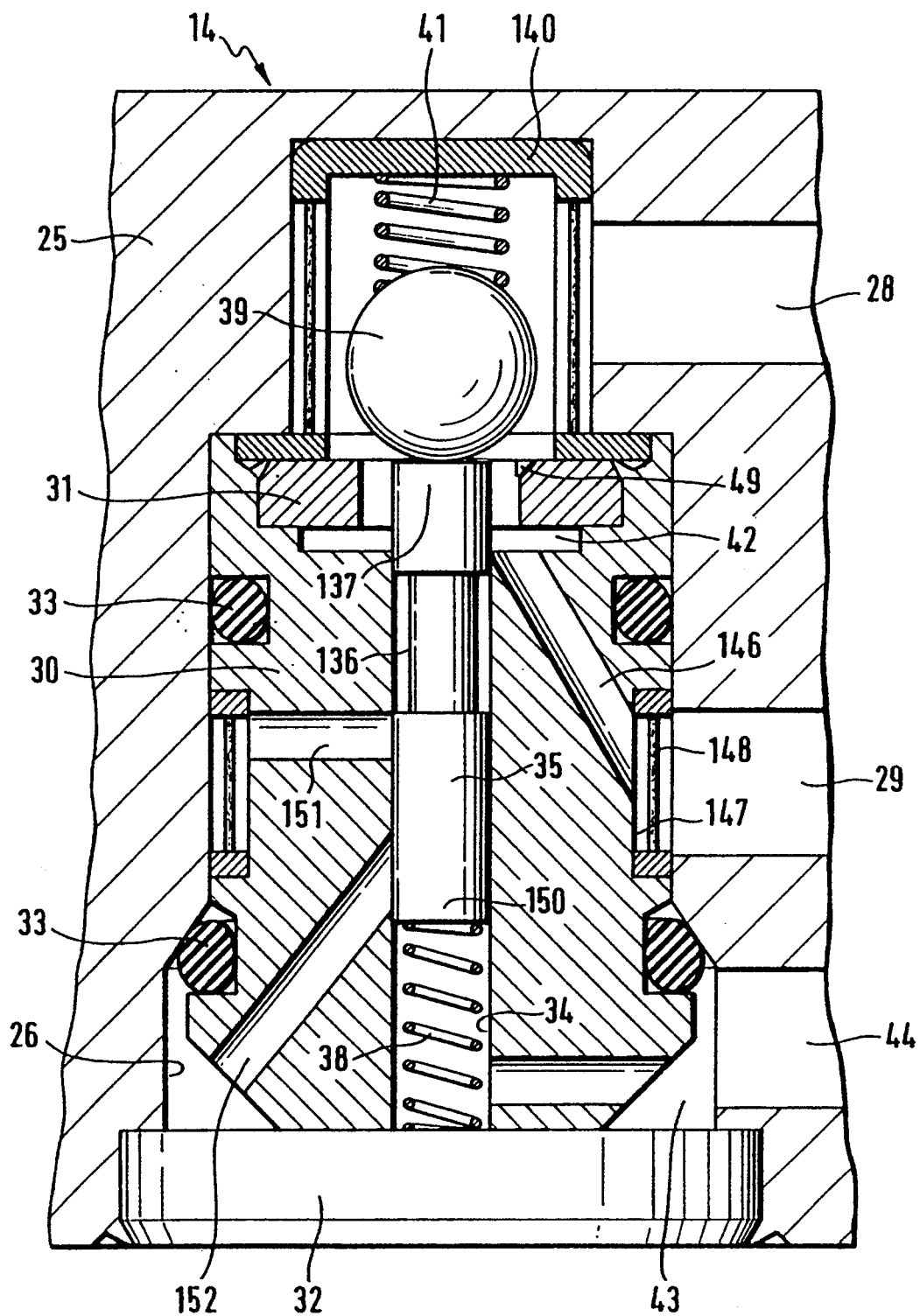
FIG. 4 is a cross-sectional view of yet another embodiment of the hydraulically controlled inlet valve of the inventive brake pressure control apparatus.

In the embodiment of the pressure-controlled inlet valve 14 illustrated in FIG. 4, a stepped bore 26 is arranged within a housing 25. Connecting bores 28, 29, 44, disposed parallel to one another, extend at right angles to stepped bore 26 and open into the stepped bore. In stepped bore 26, there is accommodated a bushing-shaped valve insert 30 with a valve seat 31. Valve insert 30 is retained by a plug 32 which closes off the stepped bore 26 toward the outside. Sealing rings 33 seal off the valve insert 30 on either side of the connecting bore 29 within the stepped bore 26. The valve insert 30 has a longitudinal bore 34 having a diameter which is smaller than the inside diameter of the valve seat 31. Within longitudinal bore 34, an axially movable control piston with a control groove 136 is accommodated. With its end 137 projecting into the valve seat 31, the control piston 35 is urged against a ball 39, serving as a valve element, by a compression spring 38 taking support at one end by the plug 32. The ball 39 is positioned in a filter insert 140 which is arranged in the closed, final step of the stepped bore 26 and is supported by a compression spring 41 at the bottom of the filter element 140. The forces of the compression springs 38, 41 are selected so that, without any additional action of pressure, the ball 39 is lifted off from the valve seat 31 by the control piston 35.

The control piston 35 divides the longitudinal bore 34 into a valve chamber 42 which is positioned adjacent to the valve seat 31, on one side, and an outlet chamber 43 into which the connecting bore 44 opens, on the other side. The valve chamber 42 is connected with the connecting bore 29 through an inclined bore 146 in the valve insert 30. The inclined bore 146 opens into a ring-shaped groove 147 located between the sealing rings 33 in the outside surface of the valve insert 30. A ring-shaped filter insert 148 is positioned in groove 147. The connecting bore 28 opens into the final step of the stepped bore 26 which is separated from the valve chamber 42 by the valve seat 31.

In the sealing edge of the valve seat 31, a restrictor orifice 49 is formed by a notch which becomes effective when the valve seat 31 is in the closed condition and which connects the final step of the stepped bore 26 to the valve chamber 42, parallel to the valve seat 31.

FIG. 4 shows an inlet valve 14 in its normal position in which the connecting bore 28 which is connected to the pressure lines 6, 7 is connected through the open valve seat 31 with the connecting bore 29 which is connected to the pressure lines 12, 13. With its end 150, which is positioned adjacent to the compression spring 38, the control piston 35 separates, in a pressure-tight manner, two valve bores 151, 152 which open into the longitudinal bore 34 at two axially spaced points. Through the ring-shaped groove 147, valve bore 151 connects the longitudinal bore 34 to the connecting bore 29, and valve bore 152 connects the longitudinal bore 34, through the outlet chamber 43, to the connecting bore 44. The inlet valve 14 will remain in this normal position as long as no brake pressure control action takes place and the outlet valve 16, which is connected to the connecting bore 44, is in the closed condition. In this configuration, the brakes HR, HL will be pressurized by an actuation of the master brake cylinder 1, depending on the force exerted by the brake pedal 3.

If and when, during a braking action, one of the vehicle wheels, for example the righthand rear wheel tends to be locked, as determined by means of sensors which are provided for this purpose, then the outlet valve 16 of the brake HR which is associated with that wheel will be switched into its open position by an electronic controller, whereby the pressure in the outlet chamber 43 decreases to the pressure in the return line 17, while the pressure which has been generated for the actuation of the brake still exists in the valve chamber 42 and in the connecting bores 28, 29. The differential pressure at the control piston 35, which comes about suddenly, will cause the control piston to slide against the force of the compression spring 38 in the direction of the outlet chamber 43, with the result that the ball 39 will close the valve seat 31 to interrupt the direct connection of the connecting bores 28, 29 down to the cross-sectional area of the restrictor orifice 49. During this operation, the shift of the control piston 35 will cause a pressure reduction in the connecting bore 29 and, thus, at the wheel cylinder of the associated brake HR. Upon the closure of the valve seat 31, the control piston 35 will be further shifted by the differential pressure a sufficient distance in the direction of the outlet chamber 43 until the control groove 136 reaches the mouth of the valve bore 152 and connects the valve bore 152 to the valve bore 151. As a result, hydraulic pressure fluid can now flow directly out of the connecting bore 29 and out of the wheel cylinder connected to connecting bore 29 through the valve bores 151, 152, the outlet chamber 43, the connecting bore 44, and the outlet line 15 into the return line 17, so that the pressure reduction is propagated, in an unrestricted manner, to the wheel cylinder. In this position of the inlet valve 14, only a limited volume of hydraulic pressure fluid can pass through the restrictor orifice 49 out of the connecting bore 28. As compared to the cross-sectional area of the restrictor orifice 49, the cross-sectional outlet which is released by the control piston 35 is, however, dimensioned so large that the rapid pressure reduction will not be impaired by this taking-in of hydraulic pressure fluid.

If and when the brake slip control action requires a renewed pressure build-up, the outlet valve 16 will be closed. The pressure in the outlet chamber 43 will adapt itself to the pressure existing in the valve chamber 42, so that the compression spring 38 can cause control piston 35 to slide a sufficient distance until the end 137 of control piston 35 abuts against the ball 39 to close the mouth of valve bore 152 by the control piston. The valve seat 31 will remain closed because the differential pressure between the connecting bores 28 and 29, which has come about during the pressure reduction, will continue to retain the ball 39 on the valve seat 31. The renewed pressure build-up will take place by the hydraulic pressure fluid which flows through the restrictor orifice 49 into the valve chamber 42 and which is delivered to the duct bore 28 by the pump 19 or 20 being driven by the motor M which is switched on at the moment the brake slip control action starts. The speed of the pressure rise will, in this configuration, be determined by the dimensioning of the cross-sectional area of the restrictor orifice 49.

By a clocked actuation of the relevant outlet valve 16, a pressure maintaining phase will be achieved in that the volume of hydraulic pressure fluid which is discharged through the outlet valve 16 is adapted to the volume of hydraulic pressure fluid which is supplied through the restrictor orifice 49. In an analogous manner, the valve opening times of the outlet valve 16 can be varied by a clocked actuation, so that different pressure build-up speeds and pressure reduction speeds come about.

If and when, during the control action, the pressure in the connecting bore 29 is adapted to the pressure in the connecting bore 28 or, if and when, the pressure in the master brake cylinder 1 is reduced to the extent that the pressure in the connecting bore 28 reaches or falls short of the pressure in the connecting bore 29, then the ball 39 will be lifted off from the valve seat 31 and result in an unrestricted return flow of the hydraulic pressure fluid to the master brake cylinder 1. A pressure reduction or a release of the brake by a change of the actuating force at the brake pedal will, therefore, be possible.

We claim:

1. A brake pressure control apparatus for a hydraulic automotive vehicle brake system with a brake pressure master unit, with at least one brake pressure slave unit connected to the former through a pressure line for the actuation of a brake, with a pressure-controlled inlet valve which is positioned in said pressure line and through which said brake pressure master unit is being connected, in a first switching position, through a restrictor orifice to said brake pressure slave unit and which is furnished with a control piston which in one direction is subject to the pressure in said pressure line and in the opposite direction subject to the action of a spring and of the pressure in a return line which is connected to said valve and which contains an outlet valve which is controllable by a control device, which blocks said return line in its position of rest and which releases said return line in its switching position, characterized in that the said inlet valve is furnished with a valve element which interacts with said control piston and which in the second switching position blocks the said pressure line and releases a valve seat being formed by a longitudinal bore of the said control piston and rendering the said brake pressure slave unit connectible to said return line.

2. A brake pressure control apparatus as claimed in claim 1, characterized in that a ring-shaped slot by which the said brake pressure slave unit is connected to said return line is formed between a generated surface of the said control piston and a bore in which said control piston is accommodated.

3. A brake pressure control apparatus as claimed in claim 2, characterized in that the said control piston is formed with radial grooves in its generated surface.

4. A brake pressure control apparatus as claimed in claim 3 characterized in that the said restrictor orifice is exchangeably positioned in a duct which connects both branches of the said pressure line, parallel to the said inlet valve.

5. A brake pressure control apparatus as claimed in claim 4 characterized in that filter elements are positioned on either side of the said restrictor orifice.

6. A brake pressure control apparatus as claimed in claim 5, characterized in that the said restrictor orifice and the said filter elements are accommodated in a bushing which is insertable into a housing bore from the outside.

7. A brake pressure control apparatus as claimed in claim 6 characterized in that the said inlet valve is configurated in the shape of a double-seated ball valve with a valve element which is formed by a ball and which interacts both with an external valve seat being rigid with the housing and with a movable internal said valve seat.

8. A brake pressure control apparatus as claimed in claim 7 characterized in that in its position of rest the said valve element is maintained in a position so as to be lifted off from the said valve seats by the force of a spring which takes support at the said external valve seat, and in that means are provided for the generation of a dynamic pressure contrasting the spring force by which the said valve element is urged against the said internal valve seat at the said control piston in the presence of a flow of hydraulic pressure fluid directed from the said brake pressure master unit over the said pressure line to the said brake pressure slave unit or to the said return line.

9. A brake pressure control apparatus as claimed in claim 8, characterized in that the said means for the generation of a dynamic pressure consist of a cylindrical bushing which surrounds the said valve element constituted by the said ball at a slight distance.

10. A brake pressure control apparatus as claimed in claim 9, characterized in that the said restrictor orifice is formed by a necked range of the said bushing and by the said ball being movable into the said range.

11. A brake pressure control apparatus for a hydraulic automotive vehicle brake system, said apparatus comprising:
a brake pressure master unit;
a brake;
a pressure line for conducting pressure fluid from said brake pressure master unit to said brake;
a return line for conducting pressure fluid away from said brake;
an outlet valve in said return line for controlling flow of pressure fluid through said return line away from said brake;
and a pressure-controlled inlet valve in said pressure line and connected to said return line and having:
(a) a spring,
(b) a control piston defining a movable valve seat, said control piston movable:
 (1) in a first direction in response to the pressure of said pressure fluid in said pressure line, and
 (2) in a second direction opposite to said first direction in response to said spring and the pressure of said pressure fluid in said return line,
(c) a restrictor orifice through which said pressure fluid is conducted to said brake, and
(d) a valve element movable in response to movement of said control piston and spaced from said movable valve seat in response to movement of said control piston in said first direction to block said pressure line and connect said brake to said return line.

12. A brake pressure control apparatus according to claim 11 wherein said pressure line has a first branch which enters said pressure-controlled inlet valve and a second branch which leaves said pressure-controlled inlet valve and said restrictor orifice is positioned between said branches of the said pressure line.

13. A brake pressure control apparatus according to claim 11 wherein said valve element is seated against said movable valve seat in response to movement of said control piston in said second direction to conduct pressure fluid to said brake.

14. A brake pressure control apparatus according to claim 13 wherein said pressure-controlled inlet valve further includes a stationary valve seat and said valve element is:
(a) spaced from said stationary valve seat in response to movement of said control piston in said second direction, and
(b) seated against said stationary valve seat in response to movement of said control piston in said first direction.

15. A brake pressure control apparatus according to claim 11 wherein said pressure-controlled inlet valve further includes a stationary valve seat.

16. A brake pressure control apparatus according to claim 15 wherein said pressure-controlled inlet valve further includes:
(a) a second spring which takes support at said stationary valve seat and acts directly on said valve element to space said valve element from both said movable valve seat and said stationary valve seat in response to movement of said control piston in said second direction, and
(b) means for generating a dynamic pressure acting against said second spring to urge said valve element to seat against said movable valve seat in response to pressure fluid from said brake pressure master unit.

17. A brake pressure control apparatus according to claim 16 wherein said dynamic pressure generating means include a cylindrical bushing which surrounds and is spaced from said valve element.

18. A brake pressure control apparatus according to claim 17 wherein said valve element is a ball and said ball and said bushing form said restrictor orifice.

19. A brake pressure control apparatus for a hydraulic automotive vehicle brake system with a brake pressure master unit, with at least one brake pressure slave unit connected to the former through a pressure line for the actuation of a brake, with a pressure-controlled inlet valve which is positioned in said pressure line and is switchable from an open normal position into a restricted position in which said brake pressure master unit is connected through a restrictor orifice to said brake pressure slave unit and which is furnished with a control piston which in one direction is subject to the pressure in said pressure line and in the opposite direction subject to the action of a spring and of the pressure in a return line which is connected to said valve and which controls a connection between said brake pressure slave unit and said return line, said return line containing an outlet valve which is controllable by a control device, which blocks said return line in its position of rest and which releases said return line in its switching position, characterized:

in that said inlet valve is provided with a seat valve with a valve element which is actuatable by the said control piston and which in the restricting position blocks a valve seat which is disposed parallel to the said restrictor orifice, and in that in the restricting position said control piston is movable independently of the said valve element under the control initiated by the pressure, in that said control piston is accommodated within a longitudinal bore of a cylindrical valve insert which bears said valve seat at one end and which is furnished with valve bores ending up in said longitudinal bore at a distance from each other and being connectible to each other by means of a control groove in the said control piston, and in that in a groove in its generated surface said valve insert is provided with a ring-shaped filter insert which covers the mouth of a valve bore.

20. A brake pressure control apparatus as claimed in claim 19 characterized in that the said valve element which is formed by a ball is positioned together with a valve spring acting on the said valve element within a cup-shaped filter element being retained in its mounting position within a housing bore by the said valve insert.

21. A brake pressure control apparatus for a hydraulic automotive vehicle brake system, said apparatus comprising:

a brake pressure master unit;
a brake;
a pressure line for conducting pressure fluid from said brake pressure master unit to said brake;
a return line for conducting pressure fluid away from said brake;
an outlet valve in said return line for controlling flow of pressure fluid through said return line away from said brake;
and a pressure-controlled inlet valve in said pressure line and connected to said return line and having:
(a) a spring,
(b) a control piston defining a movable valve seat, said control piston movable:
(1) in a first direction in response to the pressure of said pressure fluid in said pressure line, and
(2) in a second direction opposite to said first direction in response to said spring and the pressure of said pressure fluid in said return line,
(c) a restrictor orifice through which said pressure fluid is conducted to said brake,
(d) a valve element movable in response to movement of said control piston and spaced from said movable valve seat in response to movement of said control piston in said first direction to block said pressure line and connect said brake to said return line, and
(e) a longitudinal bore within which said control piston moves and forming a ring-shaped passage between an outside surface of said control piston and said longitudinal bore within which the said control piston moves and by which the said brake is connected to the said return line.

22. A brake pressure control apparatus according to claim 21 wherein said control piston has radial grooves in said outside surface.

23. A brake pressure control apparatus for a hydraulic automotive vehicle brake system, said apparatus comprising:

a brake pressure master unit; a brake;
a pressure line for conducting pressure fluid from said brake pressure master unit to said brake;
a return line for conducting pressure fluid away from said brake;
an outlet valve in said return line for controlling flow of pressure fluid through said return line away from said brake;
a pressure-controlled inlet valve in said pressure line and connected to said return line and having:
(a) a spring,
(b) a control piston defining a movable valve seat, said control piston movable:
(1) in a first direction in response to the pressure of said pressure fluid in said pressure line, and
(2) in a second direction opposite to said first direction in response to said spring and the pressure of said pressure fluid in said return line,
(c) a restrictor orifice through which said pressure fluid is conducted to said brake, and
(d) a valve element movable in response to movement of said control piston and spaced from said movable valve seat in response to movement of said control piston in said first direction to block said pressure line and connect said brake to said return line;
and filter elements positioned on either side of said restrictor orifice.

24. A brake pressure control apparatus according to claim 23 further including a bushing within which said restrictor orifice and said filter elements are positioned.

25. A brake pressure control apparatus for a hydraulic automotive vehicle brake system, said apparatus comprising:

a brake pressure master unit;
a brake;
a pressure line for conducting pressure fluid from said brake pressure master unit to said brake;
a return line for conducting pressure fluid away from said brake;
an outlet valve in said return line for controlling flow of pressure fluid through said return line away from said brake;
and a pressure-controlled inlet valve in said pressure line and connected to said return line and having:

(a) a spring,
(b) a control piston defining a movable valve seat, said control piston movable:
(1) in a first direction in response to the pressure of said pressure fluid in said pressure line, and
(2) in a second direction opposite to said first direction in response to said spring and the pressure of said pressure fluid in said return line,
(c) a restrictor orifice through which said pressure fluid is conducted to said brake, and
(d) a ball valve element movable in response to movement of said control piston and spaced from said movable valve seat in response to movement of said control piston in said first direction to block said pressure line and connect said brake to said return line.

26. A brake pressure control apparatus for a hydraulic automotive vehicle brake system, said apparatus comprising:
a brake pressure master unit;
a brake;
a pressure line for conducting pressure fluid from said brake pressure master unit to said brake;
a return line for conducting pressure fluid away from said brake;
an outlet valve in said return line for controlling flow of pressure fluid through said return line away from said brake;
and a pressure-controlled inlet valve in said pressure line and connected to said return line and having:
(a) a spring,
(b) a control piston defining a movable valve seat, said control piston movable:
(1) in a first direction in response to the pressure of said pressure fluid in said pressure line, and
(2) in a second direction opposite to said first direction in response to said spring and the pressure of said pressure fluid in said return line,
(c) a restrictor orifice through which said pressure fluid is conducted to said brake, and
(d) a ball valve element movable in response to movement of said control piston and spaced from said movable valve seat in response to movement of said control piston in said first direction to block said pressure line and connect said brake to said return line, and
(e) a stationary valve seat.

27. A brake pressure control apparatus for a hydraulic automotive vehicle brake system, said apparatus comprising:
a brake pressure master unit;
a brake;
a pressure line for conducting pressure fluid from said brake pressure master unit to said brake;
a return line for conducting pressure fluid away from said brake;
an outlet valve in said return line for controlling flow of pressure fluid through said return line away from said brake;
and a pressure-controlled inlet valve in said pressure line and connected to said return line and having:
(a) a spring,
(b) a control piston having an annular groove and defining a movable valve seat, said control piston movable:
(1) in a first direction in response to the pressure of said pressure fluid in said pressure line, and
(2) in a second direction opposite to said first direction in response to said spring and the pressure of said pressure fluid in said return line,
(c) a restrictor orifice through which said pressure fluid is conducted to said brake, and
(d) a valve element movable in response to movement of said control piston and spaced from said movable valve seat in response to movement of said control piston in said first direction to block said pressure line and connect said brake to said return line, and
(e) a valve insert having:
(1) an upper end,
(2) a lower end,
(3) a longitudinal bore extending between said upper end of said valve insert and said lower of said valve insert and within which said control piston moves,
(4) a first valve bore extending from an outside surface of said valve insert at said pressure line leading to said brake and opening into said longitudinal bore of said valve insert,
(5) a second valve bore extending from said outside surface of said valve insert at said return line and opening into said longitudinal bore of said valve insert, said second valve bore connected to said first valve bore by said annular groove of said control piston through said longitudinal bore in said valve insert, and
(b) a stationary valve seat mounted on an end of said valve insert.

28. A brake pressure control apparatus according to claim 27 wherein said outside surface of said valve insert has an annular groove and said pressure-control inlet valve further includes a ring-shaped filter positioned within said groove in said outside surface of said valve insert.

29. A brake pressure control apparatus according to claim 28 wherein said valve insert has a third valve bore extending from said upper end of said valve insert to said annular groove in said outside surface of said valve insert.

30. A brake pressure control apparatus according to claim 29 wherein said valve element is a ball and said pressure-controlled inlet valve further includes:
(a) a cup-shaped filter element positioned above said valve insert and through which pressure fluid from said brake pressure master unit passes, and
(b) a second spring taking support at said cup-shaped filter element and urging said ball against said control piston.

* * * * *

UNITED STATES PATENT AND TRADEMARK OFFICE
CERTIFICATE OF CORRECTION

PATENT NO. : 5,401,085
DATED : March 28, 1995
INVENTOR(S) : Burgdorf et al.

It is certified that error appears in the above-indentified patent and that said Letters Patent is hereby corrected as shown below:

In column 14, claim 23, line 23, the words "a brake;" should begin a new line.

In column 16, claim 28, line 43, delete "pressure-control" and substitute therefor --pressure-controlled--

Signed and Sealed this

Twenty-fifth Day of July, 1995

Attest:

BRUCE LEHMAN

*Attesting Officer*     *Commissioner of Patents and Trademarks*